United States Patent
Kobayashi et al.

(10) Patent No.: US 8,691,449 B2
(45) Date of Patent: Apr. 8, 2014

(54) NONAQUEOUS ELECTROLYTE AND LITHIUM-ION SECONDARY BATTERY USING THEREOF

(75) Inventors: Toshiyuki Kobayashi, Tokai (JP); Kazushige Kohno, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 168 days.

(21) Appl. No.: 13/105,066

(22) Filed: May 11, 2011

(65) Prior Publication Data
US 2011/0281178 A1    Nov. 17, 2011

(30) Foreign Application Priority Data
May 13, 2010   (JP) ................................. 2010-110753

(51) Int. Cl.
*H01M 6/16*    (2006.01)
(52) U.S. Cl.
USPC ........................... 429/332; 429/326; 429/330
(58) Field of Classification Search
None
See application file for complete search history.

(56) References Cited

U.S. PATENT DOCUMENTS

| | | | |
|---|---|---|---|
| 2006/0199080 A1* | 9/2006 | Amine et al. | 429/326 |
| 2007/0026318 A1* | 2/2007 | Kishi et al. | 429/341 |
| 2009/0053612 A1 | 2/2009 | Ihara et al. | |
| 2012/0177988 A1* | 7/2012 | Fujii et al. | 429/200 |

FOREIGN PATENT DOCUMENTS

| | | | |
|---|---|---|---|
| CN | 101378137 | 3/2009 | |
| JP | 2001-160415 A | 6/2001 | |
| JP | 2002-203598 | * 7/2002 | ............ H01M 10/40 |
| JP | 2005-5115 A | 1/2005 | |
| JP | 2006-4746 | 1/2006 | |
| JP | 2008-235153 | 10/2008 | |
| KR | 10-2007-0097147 A | 10/2007 | |

OTHER PUBLICATIONS

U.S. Appl. No. 13/029,853, filed Feb. 17, 2011, Kobayashi et al.
Office Action dated Dec. 24, 2012.
Communication mailed Aug. 27, 2013, in connection with a Chinese Patent Application, 6 pages; Chinese Patent Office, China.
Communication mailed Sep. 3, 2013, in connection with a Japanese Patent Application, 3 pages; Japanese Patent Office, Japan.

* cited by examiner

*Primary Examiner* — Barbara Gilliam
*Assistant Examiner* — Angela Martin
(74) *Attorney, Agent, or Firm* — Antonelli, Terry, Stout & Kraus, LLP.

(57) ABSTRACT

A nonaqueous electrolyte and a lithium-ion secondary battery using the same, wherein a mixture of a cyclic carbonate, a chain carbonate, a first phosphoric acid ester wherein bonding between carbons is a single bond, and a second phosphoric acid ester wherein bonding between carbons contains a double bond is used as the nonaqueous electrolyte. It is desirable that the first phosphoric acid ester is a trimethyl phosphate. In addition, it is desirable that the second phosphoric acid ester is a dimethylisopropenyl phosphate.

19 Claims, 1 Drawing Sheet

NONAQUEOUS ELECTROLYTE AND LITHIUM-ION SECONDARY BATTERY USING THEREOF

CROSS-REFERENCE TO RELATED APPLICATION

The present application relates to subject matters described in a co-pending patent application Ser. No. 13/029,853 filed on Feb. 17, 2011 entitled "NON-AQUEOUS ELECTROLYTE AND LITHIUM SECONDARY BATTERY USING THE SAME" by Toshiyuki Kobayashi, et al. and assigned to the assignee of the present application. The disclosures of this co-pending application are incorporated herein by reference.

BACKGROUND OF THE INVENTION

The present invention relates to a nonaqueous electrolyte and a lithium-ion secondary battery using the same.

In recent years, requirement for compact-sizing or making energy density higher has been increasing, as for a power source for mobile communication such as a mobile phone, or a mobile personal computer. In addition, development has also been progressing such as a storage power source of midnight power, or a power source for power storage in combination of a solar battery or wind-power generation. Commercial application has also been progressing of an electric car, a hybrid vehicle and a hybrid train utilizing electric power as a part of motive power.

As the nonaqueous electrolyte, the one in which an electrolyte such as lithium hexafluorophosphate is dissolved in a nonaqueous solvent such as ethylene carbonate has widely been known. Such a nonaqueous solvent is generally easy to volatile, and has inflammability. In particular, for application of a relatively large-size lithium secondary battery such as the power source of power storage, use of the nonaqueous electrolyte without fear of flashing has been desired.

Accordingly, research on furnishing flame retardancy to the non-aqueous electrolyte by blending a flame retardant agent has been promoted energetically.

In JP-A-2006-4746, there has been disclosed a nonaqueous electrolyte for a secondary battery, wherein a specified phosphorous compound is contained in extremely low concentration in the nonaqueous electrolyte. It has also been described the effect that durability at high temperature is improved and decrease in initial capacity suppression is suppressed significantly by this nonaqueous electrolyte.

In JP-A-2002-203598, there has been disclosed a nonaqueous electrolyte wherein a lithium salt is dissolved in a non-aqueous solvent having a flash point of equal to or higher than 70° C., containing a cyclic carboxylate ester and a carbonate ester, and still more a cyclic phosphoric acid ester and/or a chain phosphoric acid ester are added.

SUMMARY OF THE INVENTION

However, in the case of adding a flame retardant agent to the nonaqueous electrolyte, there was a problem that increases in the addition amount to acquire sufficient flame retardancy decreases initial discharge capacity and decreases charge-discharge cycling characteristics. That is, there was still left a problem to be solved in attaining a long-life lithium-ion secondary battery having superior flame retardancy as well as superior charge-discharge cycling characteristics.

It is an object of the present invention to provide the non-aqueous electrolyte which attains the long-life lithium-ion secondary battery, having high flame retardancy, large initial discharge capacity, and superior charge-discharge cycling characteristics.

The nonaqueous electrolyte of the present invention is a mixture containing a cyclic carbonate, a chain carbonate, a first phosphoric acid ester wherein bonding between carbons is a single bond, and a second phosphoric acid ester wherein bonding between carbons contains a double bond.

According to the present invention, the nonaqueous electrolyte with high flame retardancy, large initial discharge capacity, and superior charge-discharge cycling characteristics can be obtained, by which life time of the lithium-ion secondary battery can be extended.

Other objects, features and advantages of the invention will become apparent from the following description of the embodiments of the invention taken in conjunction with the accompanying drawings.

DESCRIPTION OF THE EMBODIMENT

Figure 1:
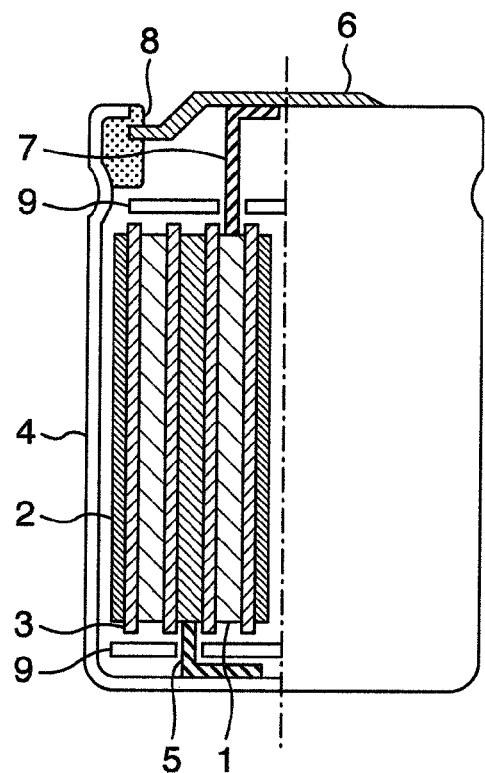
FIG. 1 is a partial cross-sectional view showing the lithium-ion secondary battery of an example.

Explanation will be given below on the nonaqueous electrolyte relevant to the first embodiment of the present invention and the lithium-ion secondary battery using the same.

The nonaqueous electrolyte contains a cyclic carbonate, a chain carbonate, a first phosphoric acid ester wherein bonding between carbons is a single bond, and a second phosphoric acid ester wherein bonding between carbons contains a double bond. In addition, it is desirable that the first phosphoric acid ester is a trimethyl phosphate. In addition, it is desirable that the second phosphoric acid ester is a dimethylisopropenyl phosphate.

It is preferable that the above nonaqueous electrolyte further contains a supporting electrolyte.

It is preferable that the supporting electrolyte is at least one kind of a lithium salt selected from the group consisting of $LiPF_6$, $LiBF_4$, $LiClO_4$, $LiAsF_6$, $LiSbF_6$, $LiCF_3SO_3$ and $LiN(SO_2CF_3)_2$.

It is preferable that the supporting electrolyte is $LiPF_6$.

It is preferable that the nonaqueous electrolyte further contains a fluorinated cyclic carbonate.

It is preferable that the fluorinated cyclic carbonate is a fluoroethylene carbonate.

It is preferable that the cyclic carbonate is an ethylene carbonate and/or a vinylene carbonate.

It is preferable that the chain carbonate is an ethylmethyl carbonate.

It is preferable that the above nonaqueous electrolyte further contains at least one kind of a salt selected from the group consisting of a bis(oxalato)borate, a difluoro(oxalato)borate, a tris(oxalato)phosphate, a difluoro (bisoxalato) phosphate, and a tetrafluoro (bisoxalato) phosphate.

It is preferable that the addition amount of the first phosphoric acid ester is 1 to 15% by weight.

It is preferable that the addition amount of the second phosphoric acid ester is 0.3 to 8% by weight. The still more preferable range is 0.5 to 6% by weight.

The lithium-ion secondary battery uses the above nonaqueous electrolyte.

Explanation will be given below in more detail.

As the first phosphoric acid ester, there is used a phosphoric acid ester, in which a bonding between carbon atoms is a single bond, such as trimethyl phosphate, triethyl phosphate, tributyl phosphate, triphenyl phosphate, tricresyl phosphate, or trixylenyl phosphate. In the present description, "a bonding between carbon atoms is a single bond" means that a bonding state between the adjacent carbon atoms composing the phosphoric acid ester is not a multiple bond such as a double bond, or a triple bond, but a single bond.

As the second phosphoric acid ester, there is used a phosphoric acid ester, in which a bonding between carbon atoms contains a double bond, such as a dimethyl isopropenyl phosphate, an allyl dimethyl phosphate, a diallyl methyl phosphate or a triallyl phosphate. In the present description, "a bonding between carbon atoms contains a double bond" means that a bonding state between the adjacent carbon atoms composing the phosphoric acid ester contains the double bond, that is, at least a part of the bonding state between the carbon atoms is at least the double bond among a single bond, a double bond and a triple bond.

As the fluorinated phosphoric acid ester, there is used a tris(2,2,2-trifluoroethyl) phosphate, a tris(2,2,3,3-tetrafluoropropyl) phosphate, a tris(2,2,3,3,4,4,5,5-octafluoropentyl) phosphate, or the like.

As the nonaqueous electrolyte (hereafter may be referred to simply as the electrolyte), for example, there can be preferably used a single substance or a mixture of an ethylene carbonate, a propylene carbonate, a butylene carbonate, a dimethyl carbonate, a diethyl carbonate, an ethylmethyl carbonate, an γ-butyrolactone, an γ-valerolactone, a tetrahydrofuran, a 2-methyltetrahydrofuran, a 1,2-dimethoxyethane, a dimethyl sulfoxide, a sulfolane or the like. Still more, for example, a fluorinated carbonate such as di(2,2,3,3-tetrafluoropropyl)carbonate can be used.

It is estimated that the vinylene carbonate and the fluorinated cyclic carbonate form a stable coating film at the surface of an electrode.

Amount of vinylene carbonate contained in the electrolyte is preferably in a range of 0.5 to 5%. The amount less than 0.5% decreases enhancement effect of cycling characteristics, while the amount over 5% leads to excess decomposition and decreases charge-discharge efficiency, and thus is not preferable.

Amount of the fluorinated cyclic carbonate contained in the electrolyte is preferably in a range of 0.5 to 15%. The amount less than 0.5% decreases enhancement effect of cycling characteristics, while the amount over 15% leads to excess decomposition and decreases charge-discharge efficiency, and thus is not preferable.

The fluorinated cyclic carbonate includes, for example, a fluoroethylene carbonate.

The supporting electrolyte used in the nonaqueous electrolyte includes, for example, $LiPF_6$, $LiBF_4$, $LiClO_4$, $LiAsF_6$, $LiSbF_6$, $LiCF_3SO_3$ and $LiN(SO_2CF_3)_2$ or the like. It is preferable that they are used alone or as a mixture. Concentration of these supporting electrolytes is not especially limited, however, it is preferably in a range of 0.8 to 2.0 mol/L.

It is also possible to add at least one kind selected from the group consisting of a bis(oxalato)borate, difluoro(oxalato) borate, a tris(oxalato)phosphate, a difluoro (bisoxalato)phosphate, and a tetrafluoro (bisoxalato)phosphate, to the electrolyte, and the addition thereof is considered to form a coating film at an electrode and enhance battery performance.

Other additives generally used may be added in an arbitrary ratio, as long as the gist of the present invention is not impaired.

A specific example thereof includes a compound having over charging prevention effect or positive electrode protection effect, such as a cyclohexylbenzene, a biphenyl, a t-butylbenzene, a 1,3-propane sultone, a 1,4-butane sulfone or the like.

Explanation will be given next on the composition of the lithium-ion secondary battery.

In the lithium secondary battery, the above nonaqueous electrolyte is used. As other composition members, those used in a general lithium-ion secondary battery can be used. Other composition members include a negative electrode, a positive electrode, a collector, a separator, a container and the like.

A material of the negative electrode is not especially limited, as long as it is a material being capable of storing and releasing lithium. For example, there is included an artificial graphite, a natural graphite, a non-graphitizable carbons, a metal oxide, a metal nitride, activated carbon, or the like. In addition, they may be used alone or in combination of two or more kinds by mixing them.

For the positive electrode, a material being capable of storing and releasing lithium may be used, such as a lithium-transition metal complex oxide such as lithium manganese oxide, lithium cobalt oxide or lithium nickel oxide. The above lithium-transition metal complex oxide is preferable.

The negative electrode and the positive electrode can be used, for example, by making a dried shape, after mixing by adding a binding agent, a thickener, an electric conducting material, a solvent or the like, as needed, and by coating it on a substrate of the collector and drying.

The binding agent includes a polyvinylidene fluoride, a polytetrafluoroethylene, a styrene-butadiene rubber, an isoprene rubber, a butadiene rubber, a polyvinyl acetate or the like.

The thickener includes a carboxyethyl cellulose, an ethyl cellulose, a polyvinyl alcohol, or the like.

The electric conducting material includes a carbon-based material such as a graphite or a carbon black, or the like.

As the separator, a microporous membrane or non-woven fabric using polyolefin such as polyethylene or polypropylene as a raw material, or the like can be used. In addition, a microporous membrane formed using a polyimide resin may also be used.

Using the above composition elements, the lithium secondary battery having a shape of a coin, a cylinder, a squre, an aluminum lamination sheet or the like can be assembled.

FIG. 1 is a partial cross-sectional view showing a lithium-ion secondary battery.

A positive electrode 1 and a negative electrode 2 are wound cylinder-likely in a sandwiched state of a separator 3, so that they do not contact directly, to form an electrode group. A positive electrode lead 7 is attached to the positive electrode 1, and a negative electrode lead 5 is attached to the negative electrode 2.

The electrode group is inserted into a battery can 4. At the bottom part and the upper part of the battery can 4, an insulating plate 9 is installed, so that the electrode group does not directly contact with the battery can 4. The electrolyte is injected in the inside of the battery can 4.

The battery can 4 is sealed in an insulated state from a lid part 6 via a packing 8.

Explanation will be given below in more specifically with reference to Examples, however, the present invention should not be limited to these Examples.

Example 1

Into a mixed solution of ethylene carbonate (EC), fluoroethylene carbonate (FEC) and ethylmethyl carbonate (EMC) (volume ratio=0.9:0.1:2), 0.8% by weight of vinylene carbonate (VC), and 1 mol/L of $LiPF_6$ were dissolved. Into this, trimethyl phosphate (TMP) and dimethylisopropenyl phosphate (DIP) were added, so as to become 5% by weight and 1% by weight, respectively, to produce an electrolyte.

On this electrolyte, the following firing test was carried out to evaluate flame retardancy.

(A Firing Test)

Into glass fiber (a width of 20 mm×a length of 65 mm), 2 mL of each of various electrolytes was impregnated, and exposed to test flame for 10 seconds in air, and after that by removing the test flame, a state of flashed flame was observed with visually, and time till extinguishment was measured. The case where extinguishing time is below 10 seconds was ranked as flame retardant, and the case where it is 10 seconds or more was ranked flammable.

In addition, a test cell was produced using the above electrolyte and graphite as the negative electrode material, to carry out a charge-discharge test.

(Evaluation of the Negative Electrode for the Lithium-Ion Secondary Battery)

Natural graphite was used as the negative electrode active material, and polyvinylidene fluoride was used as the binder.

Firstly, a solution was produced, in which the binder was dissolved in a ratio of 5% by mass into N-methyl-2-pyrrolidone. Next, into this solution, natural graphite was added and kneaded, so as to be a ratio of 8.6% by mass, and still more by adding N-methyl-2-pyrrolidone, negative electrode mixture slurry was prepared.

This negative electrode mixture slurry was coated on one surface of a copper foil, which is the collector, and dried.

After that, the negative electrode for the lithium-ion secondary battery was produced by compression molding with a roll press machine, and cutting to a predetermined size.

A test cell was produced using this negative electrode for the lithium-ion secondary battery.

Figure 2:
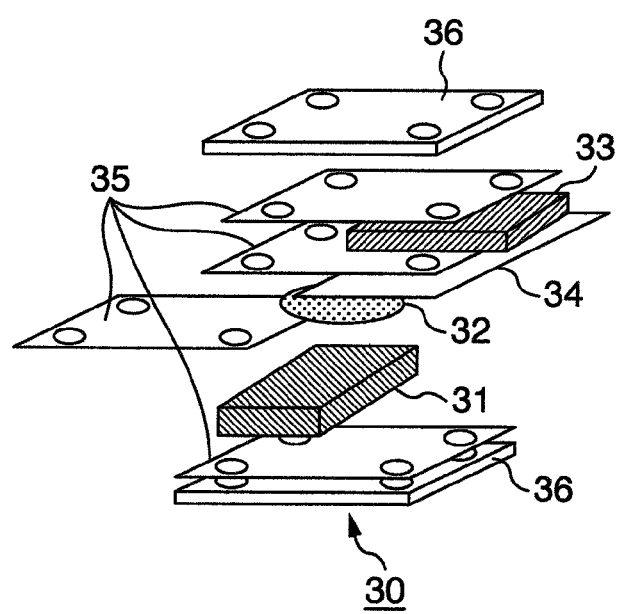
FIG. 2 is a schematic exploded view of a test cell used in a charge-discharge test.

FIG. 2 is a schematic exploded view of the test cell used in measurement.

In this drawing, a counter electrode 31, a test electrode 32 (negative electrode) and a reference electrode 33 are laminated in an insulated state, by sandwiching a separator 35 between each of them, and pressed at the exterior side with a tool 36 made of SUS.

In FIG. 2, the test electrode 32 and a collector 34 made of a copper foil are shown separately, however, they are produced as an integrated member, as described above. In addition, the test electrode 32 is drawn disk-likely with a diameter of 15 mm.

The counter electrode 31 and the reference electrode 33 are formed with metal lithium. The separator 35 is a polyethylene porous film with a thickness of 40 µm.

In this way, the test cell 30 is composed as a whole.

As an electrolyte of the test cell 30, the above electrolyte is used.

On the test cell 30 produced, evaluation of initial discharge capacity characteristics and cycling characteristics thereof was carried out by the following procedure.

Charging condition for measurement was as follows: Charging under constant current and constant voltage with a voltage value of 5 mV, a current value of 1 mA (initial) and 30 µA (termination) and a downtime of 10 minutes. In addition, discharging condition was set as a current value of 1 mA, and a cut voltage of 1.5 V.

As the initial discharge capacity characteristics, discharge capacity per unit weight of natural graphite, which is the negative electrode active material, was calculated and used, after carrying out one cycle of charge-discharge under the above condition.

In addition, as the cycling characteristics, by repeating charge-discharge under the above condition by 50 cycles, ratio of discharge capacity at 50 cycles to discharge capacity at 1 cycle (initial discharge capacity) (discharge capacity at 50 cycles/discharge capacity at 1 cycle) was calculated and used as discharge capacity retaining ratio.

The results are shown in Table 1.

TABLE 1

| | Example 1 | Example 2 | Example 3 | Comparative Example 1 | Comparative Example 2 | Comparative Example 3 |
|---|---|---|---|---|---|---|
| EC + EMC + VC (% by weight) | 90 | 90 | 90 | 90 | 90 | 90 |
| FEC (% by weight) | 10 | 10 | 10 | 10 | 10 | 10 |
| TMP (% by weight) | 5 | 5 | 5 | — | 5 | — |
| DIP (% by weight) | 1 | 3 | 5 | — | — | 5 |
| $LiPF_6$ (mol/l) | 1 | 1 | 1 | 1 | 1 | 1 |
| Firing test evaluation* | A | A | A | B | A | A |
| Initial discharge capacity (Ah/kg) | 351 | 352 | 342 | 321 | 324 | 343 |
| 50 cycle (Ah/kg) | 341 | 325 | 311 | 293 | 306 | 323 |
| Capacity retaining rate (%, 50 cycle) | 97 | 92 | 91 | 91 | 95 | 94 |

(Note)
A: flame retardant,
B: flammable

Example 2

An electrolyte was prepared similarly as in Example 1, except that the Electrolyte was prepared by adding dimethyl isopropenyl phosphate (DIP), so as to be 3% by mass, to carry out the firing test and the charge-discharge test.

The results are shown in Table 1.

Example 3

An electrolyte was prepared similarly as in Example 1, except that the electrolyte was prepared by adding dimethyl isopropenyl phosphate (DIP), so as to be 5% by mass, to carry out the firing test and the charge-discharge test.

The results are shown in Table 1.

Comparative Example 1

An electrolyte was prepared similarly as in Example 1, except that trimethyl phosphate (TMP) and dimethyl isopropenyl phosphate (DIP) were not added, to carry out the firing test and the charge-discharge test.

The results are shown in Table 1.

Comparative Example 2

An electrolyte was prepared similarly as in Example 1, except that dimethyl isopropenyl phosphate (DIP) was not added, to carry out the firing test and the charge-discharge test.

The results are shown in Table 1.

Comparative Example 3

An electrolyte was prepared similarly as in Example 3, except that trimethyl phosphate (TMP) was not added, to carry out the firing test and the charge-discharge test.

The results are shown in Table 1.

As is clear from Table 1, the electrolytes of Example 1, 2 and 3 have flame retardancy, as well as high initial discharge capacity and the capacity retaining ratio, after the cycle test, of 90% or higher, and is superior in durability.

On the other hand, in Comparative Examples 1 to 3, those having all of flame retardancy, initial discharge capacity and the capacity retaining ratio after the cycle test were not found.

It should be noted that Comparative Example 3 showed an extinguishing time of about 8 seconds in the above firing test, and seems to be a little longer as compared with Examples 1, 2 and 3, where the extinguishing time is below 2 seconds. Comparative Example 3, consequently, provided a little inferior result as compared with Examples 1, 2 and 3, although being evaluation as flame retardancy.

Example 4

Evaluation was carried out on the lithium-ion secondary battery with a 18650 (a diameter of 18 mm×a height of 65 mm)-type battery, using the electrolyte and the negative electrode of Example 1.

FIG. 1 a partial cross-sectional view showing the lithium-ion secondary battery.

The positive electrode 1 and the negative electrode 2 are wound cylinder-likely in a sandwiched state of the separator 3, so that they do not contact directly, to form an electrode group. the positive electrode lead 7 is attached to the positive electrode 1, and the negative electrode lead 5 is attached to the negative electrode 2.

The electrode group is inserted into the battery can 4. At the bottom part and the upper part of the battery can 4, the insulating plate 9 is installed, so that the electrode group does not directly contact with the battery can 4. The electrolyte is injected in the inside of the battery can 4.

The battery can 4 is sealed in an insulated state from the lid part 6 via the packing 8.

In the present Example, the positive electrode was produced by the following method.

Firstly, $LiMn_2O_4$, which is the positive electrode active material, and graphite, which is the electric conducting material, were mixed, and still more, the binding agent (a solution in which polyvinylidene fluoride is dissolved in N-methyl-2-pyrrolidone) was added and kneaded to produce the positive electrode mixture slurry. In this time, it was formulated so that the positive electrode active material is 88.5% by weight, the electric conducting material is 4.5% by weight, and the bonding agent is 7% by weight.

After this positive electrode mixture slurry was coated at one surface (front surface) of an aluminum foil, which is the collector, it was dried at 100° C. By a similar method, the other surface (back surface) of the aluminum foil was coated and dried as well.

And, by compression molding with a roll press machine, and then cutting to a predetermined size, a lead strip made of the aluminum foil for taking out electric current was welded to obtain the positive electrode.

This positive electrode and the negative electrode produced by a method of Example 1 were wound cylinder-likely in a sandwiched state of a separator, so that they do not contact directly, which was then inserted to the 18650-type battery can.

After a collector tab and the lid part of the battery can were connected, the lid part of the battery can and the battery can were welded by laser welding to seal the battery.

Lastly, by pouring the nonaqueous electrolyte from a liquid charging port installed at the battery can, the 18650-type battery (lithium-ion secondary battery) was obtained.

Evaluation of cycling characteristics of the lithium-ion secondary battery produced was carried out by the following procedure.

Firstly, the lithium-ion secondary battery was put in a thermostatic chamber at 25° C. and held for 1 hour.

As the initial stage, charging was conducted as follows: charging under constant current and constant voltage, up to 4.2 V with a current of 0.3 A, and then discharging was conducted down to 2.7 V with a current of 0.3 A. After that, there were repeated three cycles of charging under constant current and constant voltage, up to 4.2 V with a current of 1 A, and discharging down to 2.7 V with a current of 1 A. In this way discharge capacity at the three cycles was adopted as the initial discharge capacity.

After that, as the cycling characteristics, the lithium-ion secondary battery was put in a thermostatic chamber held at 45° C. By repeating 50 cycles of charging and discharging, wherein charging at constant current and constant voltage was carried out under charging condition of a current value of 0.5 A and the upper limit voltage value of 4.2 V, and discharging at constant current was carried out under discharging condition of a current value of 0.5 A and the lower limit voltage value of 3.0 V, ratio of discharge capacity at 50 cycles to discharge capacity at 1 cycle (discharge capacity at 50 cycles/discharge capacity at 1 cycle) was calculated as discharge capacity retaining ratio.

As a result, discharge capacity retaining ratio after 50 cycles was obtained to be 78%.

Example 5

The cycle test was carried out similarly as in Example 4, except that the electrolyte of Example 2 was used. As a result, discharge capacity retaining ratio after 50 cycles was obtained to be 75%.

Example 6

The cycle test was carried out similarly as in Example 4, except that the Electrolyte of Example 3 was used. As a result, discharge capacity retaining ratio after 50 cycles was obtained to be 66%.

As explained above, it was demonstrated that, according to the present invention, the lithium-ion secondary battery can be provided, wherein flame retardancy and high charge-discharge cycling characteristics of the nonaqueous electrolyte are satisfied at the same time.

The above nonaqueous electrolyte and the lithium-ion secondary battery using the same contribute to performance enhancement of power source for power storage, an electric car, or the like.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A nonaqueous electrolyte comprising a cyclic carbonate, a chain carbonate, a first phosphoric acid ester wherein bonding between carbons is a single bond, and a second phosphoric acid ester wherein bonding between carbons contains a double bond,
wherein the first phosphoric acid ester is trimethyl phosphate, and the second phosphoric acid ester is selected from the group consisting of dimethylisopropenyl phosphate, diallyl methyl phosphate and triallyl phosphate.

2. The nonaqueous electrolyte according to claim 1, wherein the second phosphoric acid ester is dimethylisopropenyl phosphate.

3. The nonaqueous electrolyte according to claim 1, further comprising a supporting electrolyte.

4. The nonaqueous electrolyte according to claim 3, wherein the supporting electrolyte is at least one kind of a lithium salt selected from the group consisting of $LiPF_6$, $LiBF_4$, $LiClO_4$, $LiAsF_6$, $LiSbF_6$, $LiCF_3SO_3$ and $LiN(SO_2CF_3)_2$.

5. The nonaqueous electrolyte according to claim 3, wherein the supporting electrolyte is $LiPF_6$.

6. The nonaqueous electrolyte according to claim 1, further comprising a fluorinated cyclic carbonate.

7. The nonaqueous electrolyte according to claim 6, wherein the fluorinated cyclic carbonate is fluoroethylene carbonate.

8. The nonaqueous electrolyte according to claim 1, wherein the cyclic carbonate is ethylene carbonate and/or vinylene carbonate.

9. The nonaqueous electrolyte according to claim 1, wherein the chain carbonate is ethylmethyl carbonate.

10. The nonaqueous electrolyte according to claim 1, further comprising at least one kind of a salt selected from the group consisting of a bis(oxalato)borate, a difluoro(oxalato)borate, a tris(oxalato)phosphate, a difluoro(bisoxalato)phosphate, and a tetrafluoro(bisoxalato)phosphate.

11. The nonaqueous electrolyte according to claim 1, wherein the addition amount of the first phosphoric acid ester is 1 to 15% by weight.

12. The nonaqueous electrolyte according to claim 1, wherein the addition amount of the second phosphoric acid ester is 0.3 to 8% by weight.

13. A lithium-ion secondary battery using the nonaqueous electrolyte according to claim 1.

14. A nonaqueous electrolyte comprising a cyclic carbonate, a chain carbonate, a first phosphoric acid ester, and a second phosphoric acid ester,
wherein the first phosphoric acid ester is selected from the group consisting of trimethyl phosphate, triethyl phosphate, tributyl phosphate, triphenyl phosphate, tricresyl phosphate, and trixylenyl phosphate, and
the second phosphoric acid ester is selected from the group consisting of dimethylisopropenyl phosphate, diallyl methyl phosphate, and triallyl phosphate.

15. The nonaqueous electrolyte according to claim 14, wherein the second phosphoric acid ester is dimethylisopropenyl phosphate.

16. The nonaqueous electrolyte according to claim 14, further comprising a supporting electrolyte, wherein the supporting electrolyte is at least one kind of a lithium salt selected from the group consisting of $LiPF_6$, $LiBF_4$, $LiClO_4$, $LiAsF_6$, $LiSbF_6$, $LiCF_3SO_3$ and $LiN(SO_2CF_3)_2$.

17. The nonaqueous electrolyte according to claim 14, wherein the addition amount of the first phosphoric acid ester is 1 to 15% by weight.

18. The nonaqueous electrolyte according to claim 14, wherein the addition amount of the second phosphoric acid ester is 0.3 to 8% by weight.

19. A lithium-ion secondary battery using the nonaqueous electrolyte according to claim 14.

* * * * *